United States Patent
Cao et al.

(10) Patent No.: US 11,913,420 B2
(45) Date of Patent: Feb. 27, 2024

(54) ANCHORING DEVICE FOR ADAPTING TO TIDE LEVEL OF WAVE ENERGY POWER GENERATION DEVICE, AND OPERATING METHOD THEREFOR

(71) Applicant: OCEAN UNIVERSITY OF CHINA, Qindao (CN)

(72) Inventors: Feifei Cao, Qindao (CN); Hongda Shi, Qindao (CN); Meng Han, Qindao (CN); Xiaoqiang Jiang, Qindao (CN); Ziyue Zhong, Qindao (CN); Yilin Pan, Qindao (CN); Haozhe Bai, Qindao (CN); Zhen Liu, Qindao (CN); Ji Tao, Qindao (CN)

(73) Assignee: OCEAN UNIVERSITY OF CHINA, Qindao (CN)

( * ) Notice: Subject to any disclaimer, the term of this patent is extended or adjusted under 35 U.S.C. 154(b) by 408 days.

(21) Appl. No.: 17/422,319

(22) PCT Filed: Jan. 10, 2020

(86) PCT No.: PCT/CN2020/071383
§ 371 (c)(1),
(2) Date: Jul. 12, 2021

(87) PCT Pub. No.: WO2020/147655
PCT Pub. Date: Jul. 23, 2020

(65) Prior Publication Data
US 2022/0099063 A1    Mar. 31, 2022

(30) Foreign Application Priority Data
Jan. 14, 2019 (CN) .......................... 201910032936.5

(51) Int. Cl.
*F03B 13/14* (2006.01)
*B63B 21/46* (2006.01)

(52) U.S. Cl.
CPC .............. *F03B 13/14* (2013.01); *B63B 21/46* (2013.01)

(58) Field of Classification Search
CPC .......... F03B 13/14; F03B 11/02; F03B 11/00; B63B 21/46; F05B 2240/917; F05B 2260/5032; Y02E 10/20; Y02E 10/30
See application file for complete search history.

(56) References Cited

U.S. PATENT DOCUMENTS

2017/0145984 A1*   5/2017   Matthews ............ B01D 61/025

FOREIGN PATENT DOCUMENTS

| CN | 1064134 A | 9/1992 | |
|---|---|---|---|
| EP | 2386748 A2 | 11/2011 | |
| WO | WO-2009105011 A1 * | 8/2009 | .......... F03B 13/1815 |

* cited by examiner

*Primary Examiner* — Anthony D Wiest
(74) *Attorney, Agent, or Firm* — Alleman Hall & Tuttle LLP

(57) ABSTRACT

An anchoring device for adapting to tide level for a wave energy power generation device comprises: a housing, wherein a central main shaft is provided at the center thereof, two ends of the central main shaft are respectively rigidly connected to a volute spring, and the interior of the housing is divided into several independent compartments, including a central compartment accommodating the central main shaft; a shaft lock and a central main gear capable of driving the central main shaft to rotate mounted on the central main shaft; and a plurality of hoisting wheel compartments arranged at equal intervals in a circumferential array around the central main shaft. A hoisting wheel is provided in each of the hoisting wheel compartments, and an anchor chain wound on the hoisting wheel protrudes out of the housing through an opening at the bottom of the hoisting wheel compartment.

9 Claims, 4 Drawing Sheets

ANCHORING DEVICE FOR ADAPTING TO TIDE LEVEL OF WAVE ENERGY POWER GENERATION DEVICE, AND OPERATING METHOD THEREFOR

TECHNICAL FIELD

The invention involves in the field of wave energy power generation devices, and particularly relates to an anchoring device for adapting to tide level for wave energy power generation device, and an operating method thereof in the field.

BACKGROUND

Wave energy power generation devices are currently generally deployed in nearshore or offshore waters, and there are various forms such as oscillating water-column, pendulum, wave-overtopping, and point absorption, among which, wave-overtopping energy power devices, point absorption energy power devices, and pendulum wave energy power devices are greatly affected by the changes in tide level. At present, various wave energy power generation devices at home and abroad mostly use hydraulic self-lifting systems to deal with changes in tide level, but this method has disadvantages such as high cost and difficulty in repairing when failures occur. Furthermore, a switch is used to generate electrical signals as the tide level changes during flux and reflux so as to control the fluctuation of the motor, or with the principle of the connector, the wave power generation device is used in combination with a tide well, and a level gauge is provided in the well to determine variation in the water level, and then logical judgments are made via PLC (programmable logic controller) to control the fluctuation of the motor. However, these tide level adaptation methods also have disadvantages such as complex structure, error-proneness, and high water-proof requirements.

SUMMARY

Technical Problem

The technical problem to be solved by the present invention is to provide a mechanical energy storage controlled anchoring device for adapting to tide level for a wave energy power generation device, and an operating method thereof.

The Solution to the Problem

Technical Solutions

In one aspect, the present invention provides an anchoring device for adapting to tide level for a wave energy power generation device, wherein the anchoring device comprises a housing with a central main shaft provided at the center thereof, wherein two ends of the central main shaft are respectively rigidly connected to a volute spring; a shaft lock and a central main gear capable of driving the central main shaft to rotate are mounted on the central main shaft; the interior of the housing is divided into a plurality of independent compartments, including a central compartment accommodating the central main shaft, and a plurality of hoisting wheel compartments are arranged at equal intervals in a circumferential array around the central main shaft; and a hoisting wheel is provided in each of the hoisting wheel compartments, an anchor chain wound on the hoisting wheel protrudes out of the housing through an opening at the bottom of the hoisting wheel compartment, each side of the hoisting wheel is provided with an extension shaft, and a first chain wheel is installed on the part of the extension shaft that passes through the hoisting wheel compartment; a plurality of horizontal shafts respectively corresponding to the hoisting wheel compartments and vertical shafts respectively corresponding to the horizontal shafts are arranged in the central compartment, and a vertical bevel gear is fixedly installed on each horizontal shaft; and a transverse bevel gear meshing with the vertical bevel gear and a gear meshing with the central main gear are installed on each vertical shaft, a second chain wheel capable of driving the horizontal shaft to rotate is installed on the part where both ends of each horizontal shaft pass through the central compartment, and the first chain wheel and the second chain wheel are connected by a chain drive.

Further, the housing is cylindrical.

Further, the central main shaft is fixed on upper and lower top plates of the housing through upper and lower bearings.

Further, the shaft lock is provided with a built-in timer and a battery.

Further, the hoisting wheel compartments are honeycomb hexagon compartments.

Further, a fixed shaft is installed obliquely below the hoisting wheel within the hoisting wheel compartment, a fixed pulley is set on the fixed shaft, and the anchor chain passes through the fixed pulley and then protrudes out of the housing through the opening at the bottom of the hoisting wheel compartment.

Further, the transverse bevel gear on the vertical shaft is arranged below the gear.

In another aspect, the present invention also provides an operating method using the above-mentioned anchoring device for adapting to tide level for a wave energy power generation device, wherein the operating method comprises: after fixing the free ends of multiple anchor chains on the seabed, scaling up or scaling down the anchor chains to make the anchoring device for adapting to tide level float on the sea surface; and locking the shaft lock for a period of time and then releasing the shaft lock for a period of time, wherein when locked, the central main shaft cannot rotate, and when released, the central main shaft can rotate; when the tide level rises, if the shaft lock is in a locked state, the anchor chain will gradually tighten for it cannot protrude, the drainage volume of the anchoring device for adapting to the tide level increases, and the water level line rises, and if the shaft lock is released the anchor chain protrudes to drive the hoisting wheel where the anchor chain is located to rotate, and when the hoisting wheel rotates, it drives the corresponding horizontal axis to rotate via a chain, and then drives the corresponding vertical shaft to rotate by the transmission between the vertical bevel gear and the transverse bevel gear, and finally drives the central main shaft to rotate via the gears on the vertical shafts that mesh with the central main gear at the same time so that the volute springs on both ends of the central main shaft shrink and store energy; when the tide level drops, if the shaft lock is in the locked state, the anchor chains gradually slacken for it cannot retract, and if the shaft lock is released, the volute spring releases elastic potential energy and drives the central main gear to rotate in a direction opposite to a direction of rotation when the tide level rises, so as to drive multiple hoisting wheels to rotate via corresponding vertical and horizontal axes respectively, so that automatic retraction of the anchor chains can be achieved.

Further, the shaft lock is locked for 50 minutes and then released for 10 minutes.

The Beneficial Effects of the Invention

Beneficial Effects

The anchoring device disclosed in the present invention can match various types of wave energy power generation devices such as pendulum type and point absorption type, and based on the principle of mechanical energy storage, the anchor chains can automatically stretch with the rise and fall of the tide level, so that the wave energy power generation device can also work stably in the sea areas with a large tidal range.

The hoisting wheel compartment of the anchoring device disclosed in the present invention adopts a honeycomb hexagonal compartment, and when one compartment enters water, the other compartments can still meet the working conditions.

The operating method disclosed in the present invention uses a shaft lock to intermittently lock the central main shaft, so that the range of motion of the wave energy generating device will not be too wide, thereby adapting to changes in tide level, and being safer and more stable when encountering conditions such as large waves.

BRIEF DESCRIPTION OF THE DRAWINGS

Description of the Drawings

Figure 1:
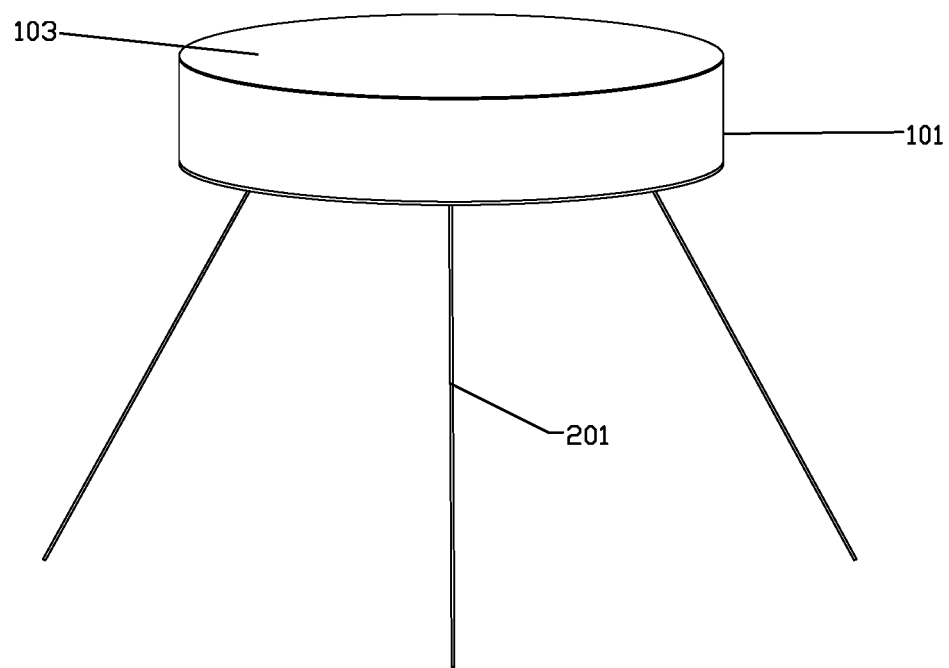

FIG. 1 shows a schematic structural diagram of an anchoring device disclosed in Example 1 of the present invention.

Figure 2:
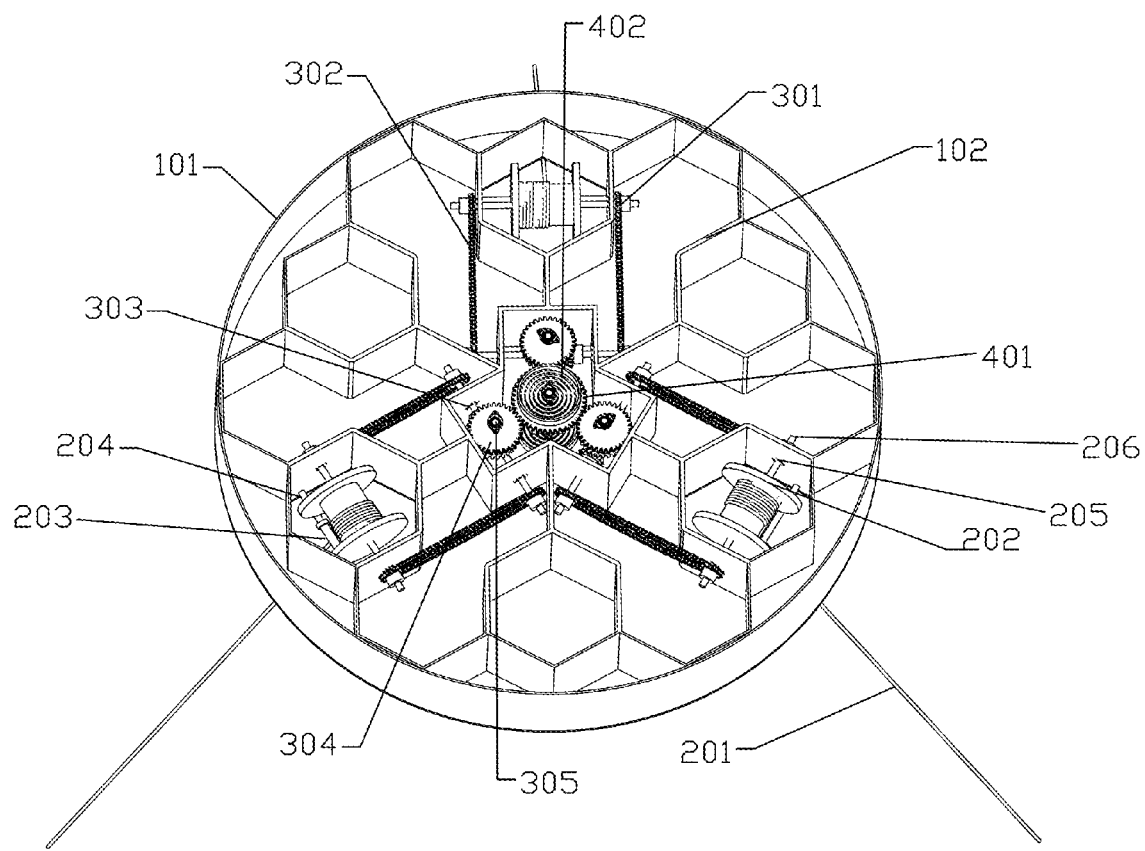

FIG. 2 shows a schematic diagram of the internal structure of the anchoring device disclosed in Example 1 of the present invention.

Figure 3:
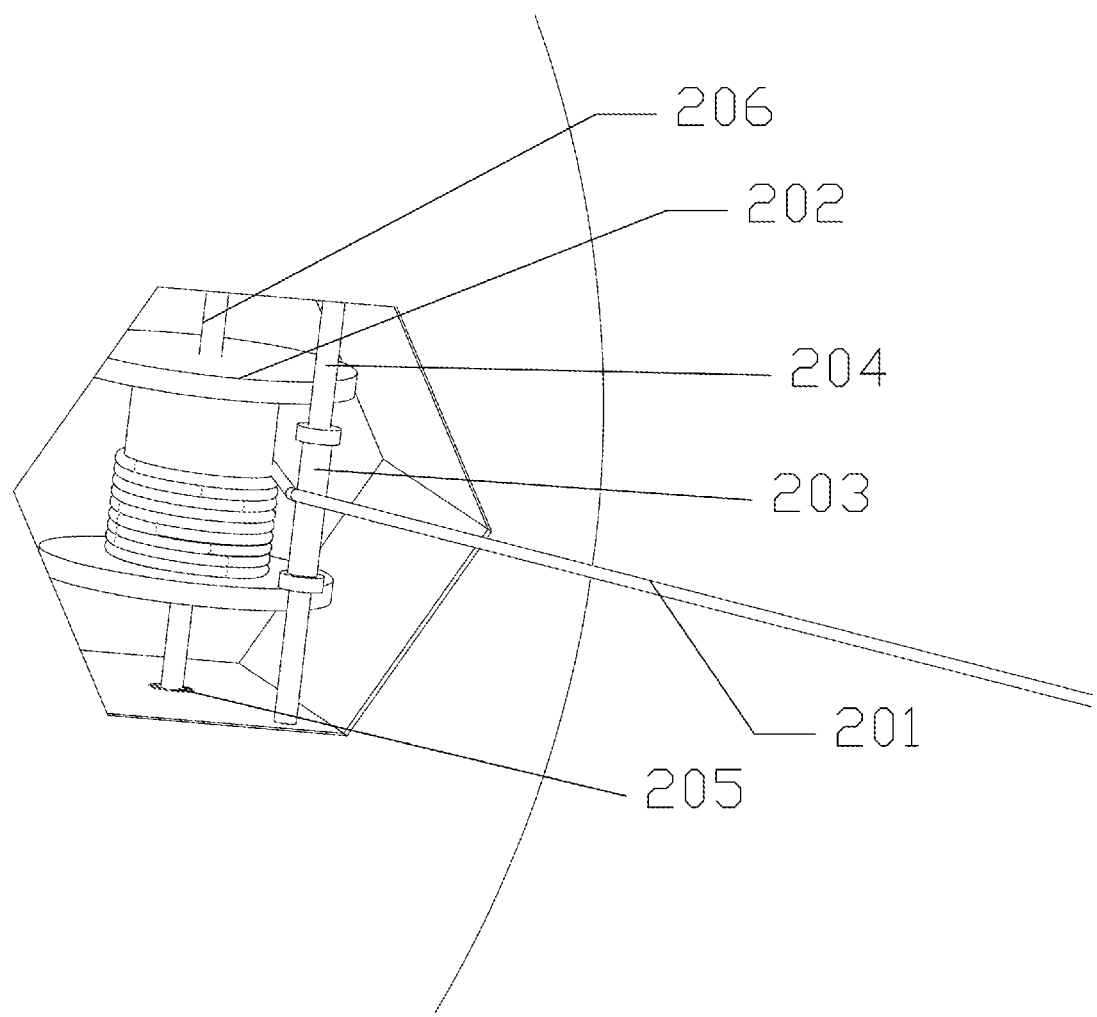

FIG. 3 shows a schematic diagram of the internal structure of a hoisting wheel compartment in the anchoring device disclosed in the Example 1 of the present invention.

Figure 4:
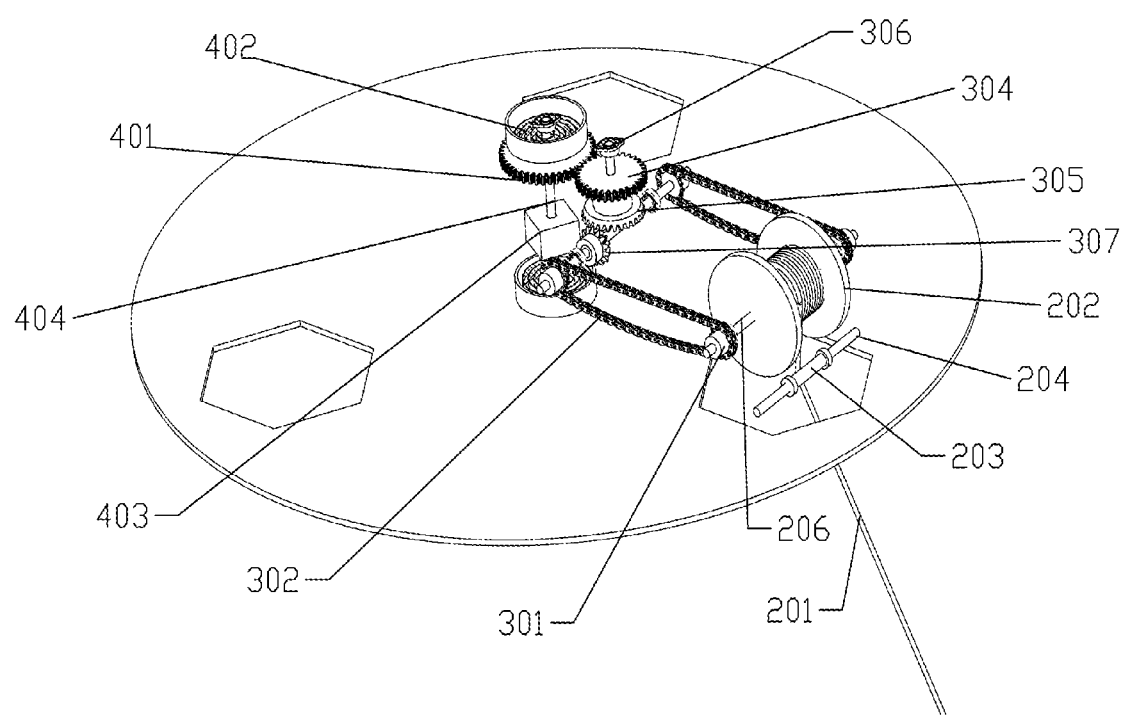

FIG. 4 shows a schematic diagram of the internal transmission relationship of the anchoring device disclosed in Example 1 of the present invention.

THE BEST EMBODIMENT FOR IMPLEMENTING THE PRESENT INVENTION

The Best Embodiment of the Present Invention

In order to make the objectives, technical solutions, and advantages of the present invention clearer, the present invention will be further described below through the following embodiments and accompany drawings. It should be understood that the following specific embodiments are only used to illustrate the present invention, not to limit the present invention.

The anchoring device for adapting to tide level for a wave energy power generation device of the present invention is a mechanical energy storage control type of tide level adaptive anchoring device. Specifically, Example 1 shown in FIG. 1 to FIG. 4 discloses an anchoring device for adapting to tide level for a wave energy power generation device, and the anchoring device includes a housing 101. In this example, the housing 101 is cylindrical. A central main shaft 404 is provided in the housing, and the central main shaft 404 is located approximately at the center of the housing 101 and extends along the axial direction of the housing 101. The central main shaft can be fixed on upper and lower top plates 103 of the housing through upper and lower bearings. Both ends of the central main shaft 404 are rigidly connected to a volute spring 402 respectively. Specifically, the central main shaft 404 is rigidly connected to the inner side of the volute spring 402, such as by being welded. Both ends of the central main shaft 404 are connected to the volute spring 402. On the one hand, the storage capacity of the volute spring is increased, and on the other hand, the force of the volute spring on both ends of the central main shaft is more balanced. If only one end is rigidly connected the volute spring, while the other end is fixed with a bearing, it will cause an uneven force, which requires a higher material strength for the central main shaft on the bearing side. In addition, a shaft lock 403 and a central main gear 401 that can drive the central main shaft to rotate are also installed on the central main shaft.

The interior of the housing is divided into a number of independent compartments via partitions 102 substantially perpendicular to the bottom of the housing 101. The compartment accommodating the central main shaft is a central compartment, and there are three other hoisting wheel compartments arranged at equal intervals in a circumferential array around the central main shaft.

A hoisting wheel 202 is arranged in the hoisting wheel compartment, and an opening is provided at the bottom of the housing corresponding to the hoisting wheel compartment, and an anchor chain 201 wound on the hoisting wheel extends out of the housing through the opening at the bottom of the hoisting wheel compartment. There is an extension shaft 206 on each side of the hoisting wheel, which passes through the hoisting wheel compartment through a bearing 205 on the hoisting wheel compartment partition. The extension shaft and the bearing are treated with dynamic sealing, and a chain wheel 301 is installed on the part of the wheel compartment where the extension shaft passes through the hoisting wheel compartment.

Three horizontal shafts 303 corresponding to the above-mentioned three hoisting wheel compartments and three vertical shafts respectively corresponding to the above-mentioned horizontal shafts are arranged in the central compartment. That is, a vertical shaft is provided in the center compartment corresponding to each horizontal shaft 303. The end of the vertical shaft is fixed to the housing by a fixed bearing 306. Specifically, the vertical shaft may be fixed to the housing at only one end. For example, in this example, the upper end of the vertical shaft may be fixed to the top of the housing with a fixed bearing 306. A vertical bevel gear 307 is fixedly installed on the horizontal shaft, and a horizontal bevel gear 305 meshing with the above-mentioned vertical bevel gear and a gear 304 meshing with the above-mentioned central main gear 401 are fixedly installed on the vertical shaft. In this example, the vertical shaft is substantively arranged above the horizontal shaft, and the transverse bevel gear 305 and the gear 304 are sequentially arranged on the vertical shaft from the bottom to the top. However, the position of the vertical shaft and the horizontal shaft of the present invention, the position of each gear, etc. are not limited thereto, as long as the horizontal bevel gear is fixedly mounted on the vertical shaft can mesh with the vertical bevel gear fixedly mounted on the horizontal shaft, and the gear 304 fixedly mounted on the vertical shaft can mesh with the central main gear 401.

The two ends of the horizontal shaft 303 pass through the central compartment, and a chain wheel that can drive the horizontal shaft to rotate is installed on the part where each end of the horizontal shaft pass through the central compartment. The chain wheel 301 of the extension shaft 206 on each side of the hoisting wheel and the chain wheel at each end of the horizontal shaft 303 are respectively connected by a chain 302 for transmission.

This example includes three hoisting wheels, three horizontal shafts and three vertical shafts. One hoisting wheel, one horizontal shaft, and one vertical shaft cooperate with each other to form a transmission unit, so this example includes three transmission units. In this example, the corresponding refers to the horizontal shaft and the vertical shaft in the same transmission unit. The gears on the vertical shafts of the three transmission units are all meshed with the central main gear, so that these gears together can drive the central main shaft to rotate, or they can be driven by the central main shaft to run synchronously. Considering the stability of the platform, it is more appropriate to use three anchor chains, so three hoisting wheels, three horizontal shafts, and three vertical shafts are provided. However, the number of hoisting wheels in the present invention is not limited to this, and can be more than three, and at this point, the layout of the compartment needs to be modified accordingly.

In this example, the shaft lock is provided with a built-in timer and a battery. The shaft lock can be used to lock the movement of the central main shaft. Shaft locks are often used inside motors, automobiles, etc., and they can usually limit the movement of the central main shaft by force and torque provided by mechanical lock sleeves, electromagnetism, pneumatic or hydraulic pressure, and can achieve electronic control in combination with a PLC controller.

The compartment of the hoisting wheel compartment is shaped as a honeycomb hexagon. Such a structure can ensure that in practical applications, if a certain non-working compartment is damaged and filled with water, the normal operation of the working compartment will not be affected. It can also ensure that the floating body of the device has considerable buoyancy to avoid ship sinkage, while the partition also strengthens the floating body of the device, increasing the reliability of the device.

In addition, as shown in FIG. 3, a fixed shaft 204 is installed obliquely below the hoisting wheel 202 in the hoisting wheel compartment, and a set pulley 203 is sleeved on the fixed shaft. The anchor chain 201 passes around the fixed pulley and goes in a different direction and then extends out of the housing through the opening at the bottom of the hoisting wheel compartment.

This example also discloses an operation method, using the above anchoring device for adapting to tide level for a wave energy power generation device.

After fixing the free ends of the three anchor chains to the seabed, scaling up or scaling down the anchor chains (specifically, the anchor chains scaling and the energy storage or discharge of the volute spring are carried out simultaneously) to make the anchoring device float on the sea surface, and locking the shaft lock for a period of time and then releasing the shaft lock for a period of time, wherein the central main shaft cannot be rotated when it is locked, while it can be rotated when it is relaxed.

When the tide level rises, if the shaft lock is in the locked state, the anchor chain will gradually tighten for it cannot protrude, the drainage volume of the anchoring device will increase, and the water level will rise; and if the shaft lock is released, part of the anchor chain will be released, the anchor chain further protrudes out of the housing from the opening at the bottom of the hoisting wheel compartment, and will drive the hoisting wheel where the anchor chain is located to rotate. As shown in FIG. 4, the rotation of the hoisting wheel can drive the corresponding horizontal shaft to rotate by the chain, and then drives the corresponding vertical shaft to rotate through the transmission between the horizontal bevel gear and the horizontal bevel, and finally drive the central main shaft to rotate via the gears on the three vertical shafts that mesh with the central main gear at the same time, so that the volute springs on both ends of the central main shaft shrink and store energy.

When the tide level drops, if the shaft lock is in the locked state, the anchor chain will gradually relax because it cannot retract. Since the ebb tide continues for a relatively long time, the wave energy power generation device as a whole will not have an excessive range of movement. When the shaft lock is released, the volute springs releases the elastic potential energy and drives the central main gear to rotate in a direction opposite to the direction of rotation when the tide level rises, thereby driving the three hoisting wheels to rotate through the corresponding vertical and horizontal shafts respectively (vertical shaft, horizontal shaft and hoisting wheel also rotate in a direction opposite to the direction of rotation when the tide level rises), so that automatic retraction of part of the anchor chain can be achieved.

As an alternative, in this example, the shaft lock is locked for 50 minutes and then released for 10 minutes. There are electronic components inside the shaft lock to control the lock and release time of the shaft lock, and the electronic components are powered by a special battery. In different sea areas, according to the specific tide conditions, the corresponding lock and release time can be adjusted appropriately. Specifically, the shaft lock is used in combination with the PLC controller to adjust the corresponding time of lock and release according to the actual sea conditions and tide changes.

The invention claimed is:

1. An anchoring device for adapting to tide level for a wave energy power generation device, comprising:
   a housing with a central main shaft provided at a center thereof, wherein
   two ends of the central main shaft are respectively rigidly connected to a volute spring,
   a shaft lock and a central main gear capable of driving the central main shaft to rotate are mounted on the central main shaft,
   an interior of the housing is divided into a plurality of independent compartments, including a central compartment accommodating the central main shaft, and a plurality of hoisting wheel compartments are arranged at equal intervals in a circumferential array around the central main shaft,
   a hoisting wheel is provided in each of the hoisting wheel compartments, an anchor chain wound on the hoisting wheel protrudes out of the housing through an opening at a bottom of the hoisting wheel compartment, each side of the hoisting wheel is provided with an extension shaft, and a first chain wheel is installed on the part of the extension shaft that passes through the hoisting wheel compartment,
   a plurality of horizontal shafts respectively corresponding to the hoisting wheel compartments and vertical shafts respectively corresponding to the horizontal shafts are arranged in the central compartment, and a vertical bevel gear is fixedly installed on each horizontal shaft, and
   a transverse bevel gear meshing with the vertical bevel gear and a gear meshing with the central main gear are installed on each vertical shaft, a second chain wheel capable of driving the horizontal shaft to rotate is installed on a part where both ends of each horizontal shaft pass through the central compartment, and the first chain wheel and the second chain wheel are connected by a chain drive.

2. The anchoring device of claim 1, wherein the housing is cylindrical.

3. The anchoring device of claim 1, wherein the central main shaft is fixed on upper and lower top plates of the housing through upper and lower bearings.

4. The anchoring device of claim 1, wherein the shaft lock is provided with a built-in timer and a battery.

5. The anchoring device of claim 1, wherein the hoisting wheel compartments are honeycomb hexagon compartments.

6. The anchoring device of claim 1, wherein a fixed shaft is installed obliquely below the hoisting wheel within the hoisting wheel compartment, a fixed pulley is set on the fixed shaft, and the anchor chain passes through the fixed pulley and then protrudes out of the housing through the opening at the bottom of the hoisting wheel compartment.

7. The anchoring device of claim 1, wherein on each vertical shaft, the transverse bevel gear is arranged below the gear meshing with the central main gear.

8. An operating method of the anchoring device of claim 1, comprising:
   after fixing the free ends of multiple anchor chains on the seabed, scaling up or scaling down the anchor chain to make the anchoring device float on the sea surface; and
   locking the shaft lock for a period of time, and then releasing the shaft lock for a period of time, wherein when the shaft lock is locked, the central main shaft cannot rotate, and when the shaft lock is released, the central main shaft can rotate,
   when the tide level rises:
      while the shaft lock is in a locked state, the anchor chain is prevented from protruding and gradually tightens, the drainage volume of the anchoring device for adapting to tide level increases, and the water level line rises, and
      while the shaft lock is in a released state, the anchor chain protrudes to drive the hoisting wheel where the anchor chain is located to rotate, the hoisting wheel rotates to drive the corresponding horizontal axis to rotate via a chain, then drives the corresponding vertical shaft to rotate by the transmission between the vertical bevel gear and the transverse bevel gear, and finally drives the central main shaft to rotate via the gears on the vertical shafts that mesh with the central main gear at the same time, so that the volute springs on both ends of the central main shaft shrink and store energy, and
   when the tide level drops:
      while the shaft lock is in the locked state, the anchor chains are prevented from retracting and gradually slacken, and
      while the shaft lock is in the released state, the volute spring releases elastic potential energy and drives the central main gear to rotate in a direction opposite to a direction of rotation when the tide level rises, so as to drive the hoisting wheel of at least some of the plurality of hoisting wheel compartments to rotate via corresponding vertical and horizontal axes respectively, so that automatic retraction of the anchor chains is achieved.

9. The operating method of claim 8, wherein the shaft lock is locked for 50 minutes and then released for 10 minutes.

* * * * *